United States Patent
Han et al.

(10) Patent No.: US 6,801,271 B2
(45) Date of Patent: Oct. 5, 2004

(54) TWO-WAY DISPLAY-TYPE LIQUID CRYSTAL DISPLAY DEVICE

(75) Inventors: Sang Hoon Han, Sungnam-Si (KR); Hyun Jung Jeong, Seoul (KR); Yong Joon Han, Seoul (KR)

(73) Assignee: PanTech, Co., Ltd., Seoul (KR)

( * ) Notice: Subject to any disclaimer, the term of this patent is extended or adjusted under 35 U.S.C. 154(b) by 145 days.

(21) Appl. No.: 10/214,430

(22) Filed: Aug. 8, 2002

(65) Prior Publication Data

US 2003/0103174 A1 Jun. 5, 2003

(30) Foreign Application Priority Data

Dec. 3, 2001 (KR) ........................................ 2001-75793

(51) Int. Cl.[7] ........................ G02F 1/1335; G02F 1/133; G02F 1/1347
(52) U.S. Cl. .............................. 349/74; 349/61; 349/73
(58) Field of Search .............................. 349/61, 73, 74

(56) References Cited

U.S. PATENT DOCUMENTS

| | | | |
|---|---|---|---|
| 4,637,687 A | | 1/1987 | Haim et al. ................. 350/335 |
| 5,103,328 A | * | 4/1992 | Numao ........................ 349/74 |
| 5,742,367 A | * | 4/1998 | Kozaki ........................ 349/69 |
| 5,856,812 A | | 1/1999 | Vossler ....................... 345/102 |
| 6,028,649 A | | 1/2000 | Faris et al. .................... 349/10 |
| 6,501,528 B1 | * | 12/2002 | Hamada ....................... 349/158 |

FOREIGN PATENT DOCUMENTS

JP 7120623 5/1995

OTHER PUBLICATIONS

Patent Abstracts of Japan; Pub. No. 09090325, Pub. Date: Apr. 04, 1997, Toshiba Corp., "Liquid Crystal Display Device" Abstract.

* cited by examiner

Primary Examiner—Julie Ngo
(74) Attorney, Agent, or Firm—Greenberg Traurig, LLP; Richard E. Kurtz, II

(57) ABSTRACT

Disclosed is a two-way display-type liquid crystal display device. The device includes a pair of upper and lower display modules for displaying different information; a plurality of two-way light sources for simultaneously supplying predetermined amounts of light rays to the upper and lower display modules; a light guide panel separately located at a side of the two-way light sources in a manner such that the upper and lower display modules are positioned on upper and lower surfaces of the light guide panel, respectively, the light guide panel functioning to guide light rays radiated from the two-way light sources in two directions toward the upper and lower display modules; a scattering film interposed between the light guide panel and the lower display module, for scattering and reflecting the light rays radiated from the two-way light sources, toward the upper display module; and a reflective and transmissive sheet interposed between the light guide panel and the lower display module, for reflecting one part of the light rays radiated from the two-way light sources, toward the upper display module, and transmitting the other part of the light rays toward the lower display module.

8 Claims, 3 Drawing Sheets

TWO-WAY DISPLAY-TYPE LIQUID CRYSTAL DISPLAY DEVICE

BACKGROUND OF THE INVENTION

1. Field of the Invention

The present invention relates to a liquid crystal display device, and more particularly, the present invention relates to a two-way display-type liquid crystal display device which enables light rays radiated from one light source to simultaneously contribute to operation of upper and lower display modules, thereby restraining the number of light sources from being unnecessarily increased, and preventing a weight and a thickness thereof from being increased and assembly thereof from being complicated due to provision of an additional light source.

2. Description of the Related Art

Recently, with the advent of the information era, importance of a liquid crystal display device as one of information display devices has been increasingly emphasized.

Differently from other information display devices such as a cathode ray tube (CRT), a plasma display panel (PDP), etc., since the liquid crystal display device renders numerous advantages in terms of miniaturization, light weight, and low power consumption, it has been widely adopted and used in various information processing devices such as a notebook computer, a desktop computer, a television, a mobile communication terminal, and so on.

Referring to FIG. 1, a conventional two-way display-type liquid crystal display device 20, which is adopted in a conventional information processing device, for example, a mobile communication terminal, largely includes a light guide panel 23, upper and lower display modules 21 and 22 which are respectively positioned on an upper surface and below a lower surface of the light guide panel 23, and a printed circuit board 25 on which diverse circuit parts for driving the upper and lower display modules 21 and 22 are mounted.

A plurality of light source chips 24 are located at a side of the light guide panel 23, and separately, a light source sheet 26 is located under the printed circuit board 25. The light source chips 24 located at the side of the light guide panel 23 function to supply light rays toward the upper display module 21, and the light source sheet 26 located under the printed circuit board 25 functions to supply light rays toward the lower display module 22.

As can be readily seen from FIG. 1, a reflective sheet 27 is interposed between the light guide panel 23 and the printed circuit board 25. The reflective sheet 27 reflects light rays radiated from the light source chips 24 toward the upper display module 21 to prevent the light rays from leaking in a direction opposite to the upper display module 21. In this connection, it is the norm that the reflective sheet 27 has a reflectance approaching 100% so as to maximize the light collection rate at the upper display module 21.

In addition to the reflective sheet 27, a plurality of reflective dots (not shown) are formed on the lower surface of the light guide panel 23. The reflective dots function to scatter and reflect light rays radiated from the light source chips 24 and light rays reflected from the reflective sheet 27 toward the upper display module 21 to thereby further improve the light collection rate at the upper display module 21. Generally, each reflective dot has a size of no less than 20 µm.

In the above-described construction, the upper display module 21 receives light rays radiated from the light source chips 24 by the medium of the light guide panel 23 and, using these light rays, displays main information of the information processing device, for example, in colors. The lower display module 22 directly receives light rays radiated from the light source sheet 26 and, using these light rays, displays simple auxiliary information of the information processing device, for example, in monochrome.

However, the conventional two-way display-type liquid crystal display device 20 constructed as mentioned above suffers from defects as described below.

First, since the upper and lower display modules 21 and 22 respectively employ, as their light sources, the light source chips 24 and the light source sheet 26, a thickness and a weight of the entire liquid crystal display device are increased due to a region additionally occupied by the light sources. Accordingly, it is difficult to maintain a quality of the liquid crystal display device above a predetermined level.

That is to say, in the case that the upper and lower display modules 21 and 22 respectively employ different light sources, the liquid crystal display device should be equipped with separate driving parts for driving the respective light sources, such as an inverter. Consequently, a thickness and a weight of the entire liquid display device are increased, and assembly thereof is complicated.

Meanwhile, as described above, the upper display module 21 displays, by using the light rays radiated from the light source chips 24, main information of the information processing device, in colors, as the case may be. In this color display mode, in order to ensure normal operation of the upper display module 21, light rays having a brightness which is 10 times greater than that of light rays in a monochrome display mode, are required.

However, since the light source chips 24, which contribute to a brightness of the upper display module 21, employ only the reflective dots to increase the brightness of the light rays, unless a quality of the light source chips 24 is not remarkably improved, a brightness requirement under the color display mode cannot be properly met. Consequently, the conventional liquid crystal display device cannot accomplish a display quality above a preselected level.

Moreover, because it is the norm that the conventional light source chips 24 are located at the only one side of the light guide panel 23 in the above-described conventional liquid crystal display device, one side end portion of the upper display module 21 which is distant from the light source chips 24 becomes darker than the other side end portion of the upper display module 21 which is close to the light source chips 24. As a result, brightness distribution uniformity of the upper display module 21 is deteriorated.

Of course, to cope with this problem, light source chips can be located at both sides of the light guide panel 23. However, in this case, a manufacturing cost of the liquid crystal display device is considerably increased, and a thickness and a weight of the entire liquid crystal display device are increased due to a region additionally occupied by the light source chips.

SUMMARY OF THE INVENTION

Accordingly, the present invention has been made in an effort to solve the problems occurring in the related art, and an object of the present invention is to provide a two-way display-type liquid crystal display device which has a part layout enabling light rays radiated from one light source to simultaneously contribute to operation of upper and lower display modules, thereby restraining the number of light sources from being unnecessarily increased, and preventing a weight and a thickness thereof from being increased and assembly thereof from being complicated due to provision of an additional light source.

Another object of the present invention is to provide a two-way display-type liquid crystal display device which has a separate structure having an improved light scattering function when compared to the conventional reflective dots, thereby increasing a brightness of light rays radiated from a light source, meeting a requirement under a color display mode and improving brightness distribution uniformity.

In order to achieve the above object, according to the present invention, there is provided a two-way display-type liquid crystal display device comprising: a pair of upper and lower display modules for displaying different information; a plurality of two-way light sources for simultaneously supplying predetermined amounts of light rays to the upper and lower display modules; a light guide panel separately located at a side of the two-way light sources in a manner such that the upper and lower display modules are positioned on upper and lower surfaces of the light guide panel, respectively, the light guide panel functioning to guide light rays radiated from the two-way light sources in two directions toward the upper and lower display modules; a scattering film interposed between the light guide panel and the lower display module, for scattering and reflecting the light rays radiated from the two-way light sources toward the upper display module; and a reflective and transmissive sheet interposed between the light guide panel and the lower display module, for reflecting one part of the light rays radiated from the two-way light sources toward the upper display module and transmitting the other part of the light rays toward the lower display module.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
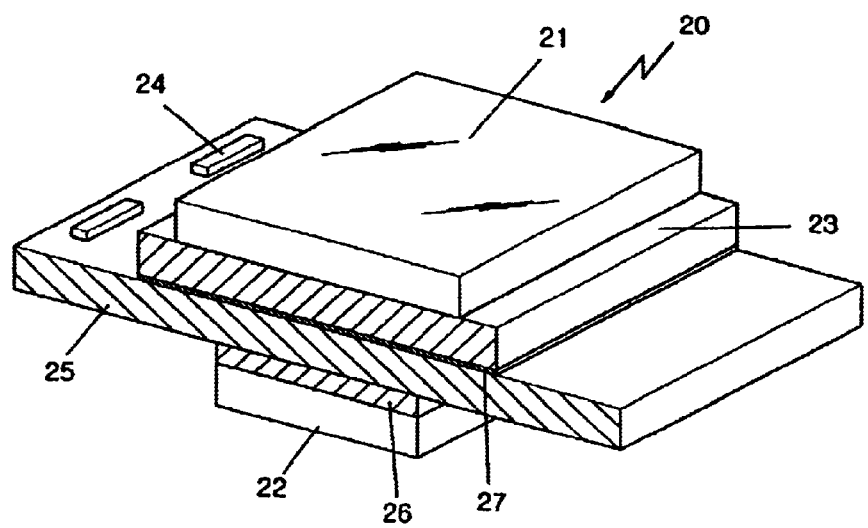
FIG. 1 is a perspective view illustrating a conventional two-way display-type liquid crystal display device.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
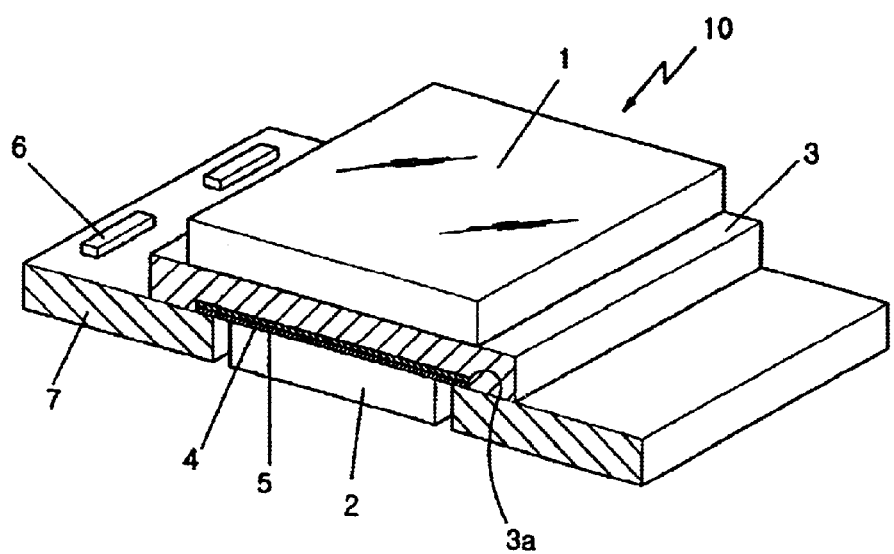
FIG. 2 is a perspective view illustrating a two-way display-type liquid crystal display device in accordance with a first embodiment of the present invention.
Figure 3:
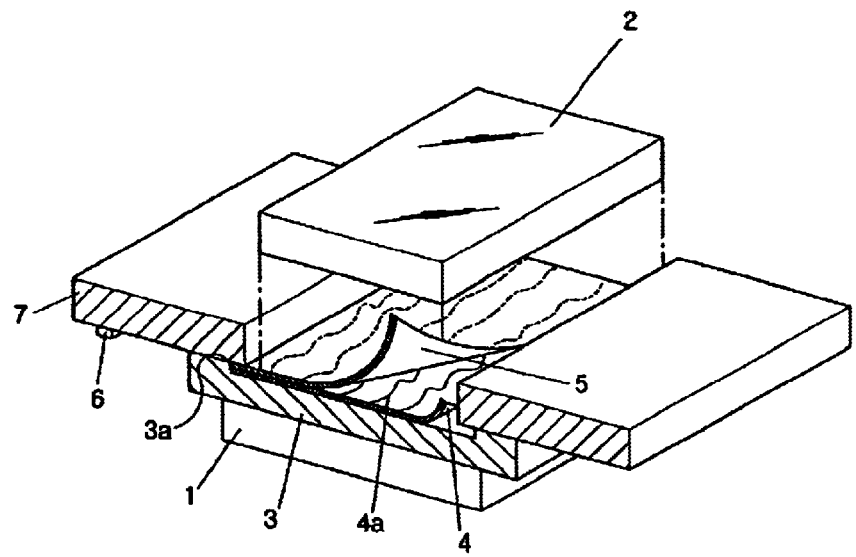
FIG. 3 is a partially-exploded upside-down view of the two-way display-type liquid crystal display device according to the first embodiment of the present invention.

As shown in FIG. 2, a two-way display-type liquid crystal display device 10 in accordance with a first embodiment of the present invention largely includes a plurality of two-way light sources 6; a light guide panel 3 which is separately located at a side of the two-way light sources 6; upper and lower display modules 1 and 2 which are respectively positioned on upper and lower surfaces of the light guide panel 3; and a printed circuit board 7 on which diverse circuit parts for driving the upper and lower display modules 1 and 2 are mounted. As can be readily seen from FIG. 2, the upper and lower display module 1 and 2 respectively rest on the upper and lower surfaces of the light guide panel 3.

The two-way light sources 6 function to simultaneously supply predetermined amounts of light rays to the upper and lower display modules 1 and 2. The light guide panel 3 guides the light rays radiated from the two-way light sources 6 in two directions toward the upper and lower display modules 1 and 2.

The upper display module 1 receives one part of the light rays radiated from the two-way light sources 6 by the medium of the light guide panel 3 and, using these light rays, displays main information of the information processing device to which the upper display module 1 belongs. The lower display module 2 receives the other part of the light rays radiated from the two-way light sources 6, which leaks through the lower surface of the light guide panel 3 and, using these light rays, displays simple auxiliary information of the information processing device to which the lower display module 2 belongs.

In the case that a color filter (not shown) is provided for the upper or lower display module 1 or 2, the corresponding display module 1 or 2 can display the corresponding information in colors.

Due to the fact that the upper display module 1 displays the main information of the information processing device, it is the norm that the upper display module 1 has the color filter to be operated under a color display mode. Also, due to the fact that the lower display module 2 displays the simple auxiliary information of the information processing device, it is the norm that the lower display module 2 is operated under a monochrome display mode without any costly color filter. Of course, as the case may be, the display modes of the upper and lower display modules 1 and 2 can be changed with each other.

When one of the upper and lower display modules 1 and 2 is operated under the color display mode, the light rays radiated from the two-way light sources 6 may be white light, which is advantageous to realization of colors.

Here, as shown in FIG. 2, a reflective and transmissive sheet 5 is interposed between the light guide panel 3 and the lower display module 2. The reflective and transmissive sheet 5 functions to reflect one part, for example, 90% of the light rays radiated from the two-way light sources 6 toward the upper display module 1, and transmit the other part, for example, 10% of the light rays toward the lower display module 2.

By the function of the reflective and transmissive sheet 5, the upper and lower display modules 1 and 2 can properly implement their information displaying procedures while commonly having the two-way light sources 6 as single light source means without requiring separate dedicated light sources as in the conventional art.

That is to say, in the conventional art, as aforementioned above, the reflective sheet interposed between the light guide panel and the printed circuit board has a reflectance approaching 100% so as to maximize a light collection rate at the upper display module. Thus, the light rays radiated from a main light source can only be reflected toward the upper display module and cannot be transmitted toward the lower display module. By this fact, the lower display module must be provided with a separate light source such as the light source sheet, whereby a thickness and a weight of the finally manufactured liquid crystal display device are increased and assembly thereof is complicated.

However, in the present invention, the reflective and transmissive sheet 5 is provided in place of the conventional reflective sheet. As described above, the reflective and transmissive sheet 5 reflects one part, for example, 90% of the light rays radiated from the two-way light sources 6 toward the upper display module 1, and transmits the other part, for example, 10% of the light rays toward the lower display module 2. Therefore, the light rays radiated from the two-way light sources 6 can widely influences both of the upper and lower display modules 1 and 2. Consequently, differently from the conventional art, the lower display module 2 can properly implement the information displaying procedure without requiring a separate light source.

In the two-way display-type liquid crystal display device 10 according to the present invention, since a part layout enabling the light rays radiated from one light source to simultaneously contribute to operation of the upper and lower display modules 1 and 2 is attained, the number of light sources is restrained from being unnecessarily increased, a weight and a thickness of the liquid crystal display device 10 are prevented from being increased, and assembly thereof is prevented from being complicated.

In the above-described construction, if separate measures are not taken, the upper display module 1 cannot but receive a reduced amount of light rays when compared to the conventional art. The reason for this is that, while the conventional reflective sheet reflects nearly 100% of the light rays radiated from the light source toward the upper display module, the present reflective and transmissive sheet 5 reflects only 90% of the light rays radiated from the two-way light sources 6 toward the upper display module 1.

In consideration of this fact, in the present invention, as shown in FIG. 2, a scattering film 4 is interposed between the light guide panel 3 and the lower display module 2, preferably between the light guide panel 3 and the reflective and transmissive sheet 5 to scatter and reflect the light rays radiated from the two-way light sources 6 toward the upper display module 1. Accordingly, a short amount of light rays to be supplied toward the upper display module 1 can be properly compensated.

A plurality of scattering lines 4a are formed on a surface of the scattering film 4 to linearly scatter the light rays radiated from the two-way light sources 6. The scattering lines 4a may be randomly or regularly arranged one with another.

In this case, the scattering lines 4a are projectedly formed to have a fine line width in the range of 0.5~5.5 µm, differently from the conventional reflective dots, to thereby form an elongate mount structure. Therefore, when compared to the case of using the conventional reflective dots, it is possible to uniformly and distantly scatter and reflect an increased amount of the light rays radiated from the two-way light sources 6 toward the upper display module 1. As a consequence, even though the upper display module 1 receives the reduced amount of light rays under the influence of the reflective and transmissive sheet 5, the upper display module 1 can properly implement its information displaying procedure since the short amount of light rays is compensated by the function of the scattering film 4.

It is to be noted that each scattering line 4a may be formed in such a way as to define a contour of an irregular curve, a straight line or a combination thereof.

Also, with a view of ensuring brightness distribution uniformity on the upper display module 1, the scattering lines 4a may be formed in a manner such that they have a low density as the scattering lines 4a are close to the light sources 6, and they have a high density as the scattering lines 4a are away from the light sources 6. It is to be appreciated that a contour and an arrangement pattern of the scattering lines 4a may be varied as occasion demands.

Hence, the scattering lines 4a adopted in the present invention not only perform a light ray compensating function, but also cooperate with the two-way light sources 6 so as to improve a brightness of the upper display module 1 and ensure brightness distribution uniformity on the upper display module 1.

As described above, by the fact that the scattering lines 4a are projectedly formed on the scattering film 4 to have the fine line width in the range of 0.5~5.5 µm, differently from the conventional reflective dots, to thereby form the elongate mount structure, the scattering lines 4a perform the function of uniformly and distantly scattering and reflecting an increased amount of light rays toward the upper display module 1 when compared to the case of using the conventional reflective dots. Thus, due to the provision of the scattering lines 4a, the upper display module 1 is significantly improved in its brightness when compared to the case of using the conventional reflective dots.

Therefore, in the present invention, by employing the scattering film 4 which cooperates with the two-way light sources 6, it is possible to increase a brightness and improve brightness distribution uniformity of the light rays supplied toward the upper display module 1, and thereby, a brightness requirement and a brightness distribution uniformity requirement under the color display mode can be properly met.

The scattering film 4 can be lightly placed on the lower surface of the light guide panel 3 by an insert molding process, or can be forcibly attached to the lower surface of the light guide panel 3 by a press molding process. It is to be appreciated that the scattering film 4 may be positioned on the lower surface of the light guide panel 3 in a variety of ways depending upon a situation.

As can be readily seen from the drawings, an accommodating groove 3a is formed on the lower surface of the light guide panel 3, on which the reflective and transmissive sheet 5 and the scattering film 4 are positioned.

Due to the presence of the accommodating groove 3a, a structure for mechanically installing the reflective and transmissive sheet 5 and the scattering film 4 can be stably reinforced. Thus, the reflective and transmissive sheet 5 and the scattering film 4 can maintain a normal configuration for an extended period of time against external impact.

Figure 4:
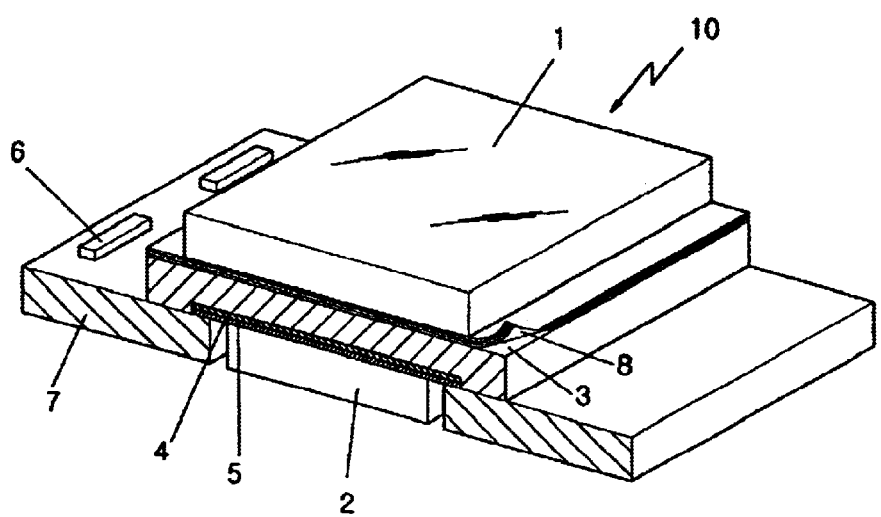
FIG. 4 is a perspective view illustrating a two-way display-type liquid crystal display device in accordance with a second embodiment of the present invention.

Meanwhile, in a second embodiment of the present invention as shown in FIG. 4, a plurality of, for example, one to three transparent diffusion sheets 8 are interposed between the light guide panel 3 and the upper display module 1 to diffuse the light rays radiated from the two-way light sources 6 toward the upper display module 1.

Grain of a micro dimension is formed on a surface of each transparent diffusion sheet 8. By the presence of the grain, the transparent diffusion sheets 8 can scatter and diffuse, over a wide area, the light rays radiated from the two-way light sources 6 toward the upper display module 1. Therefore, although the upper display module 1 receives the reduced amount of light rays under the influence of the reflective and transmissive sheet 5, the short amount of light rays can be compensated by the function of the scattering film 4 and the transparent diffusion sheet 8, as a result of which the upper display module 1 can properly implement its information displaying procedure.

Figure 5:
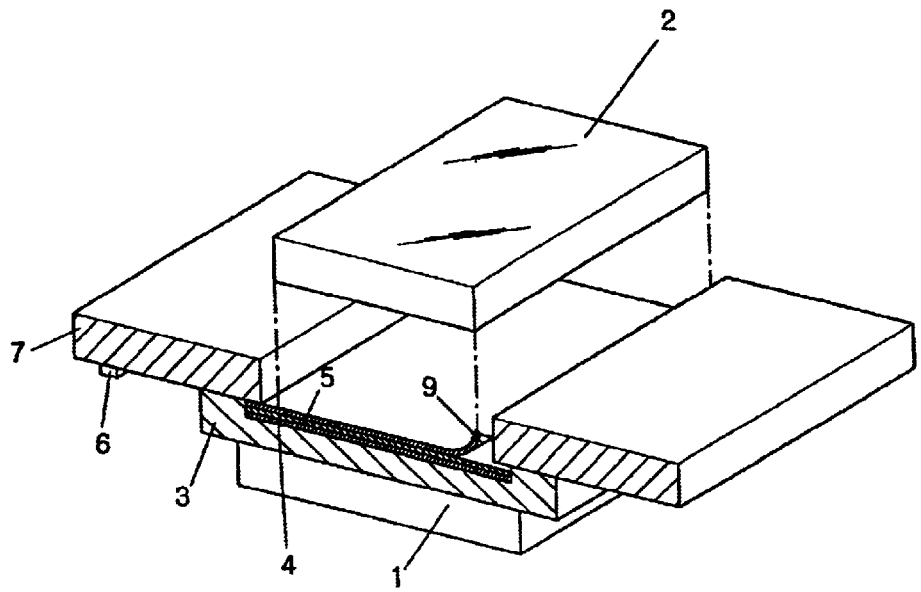
FIG. 5 is a partially-exploded upside-down view illustrating a two-way display-type liquid crystal display device in accordance with a third embodiment of the present invention.

In the meanwhile, in a third embodiment of the present invention as shown in FIG. 5, a transparent color induction film 9 is interposed between the light guide panel 3 and the lower display module 2, preferably between the reflective and transmissive sheet 5 and the lower display module 2 to colorize the light rays radiated from the two-way light sources 6.

As described above, the upper display module 1 of the present invention receives one part of the light rays radiated from the two-way light sources 6 by the medium of the light guide panel 3 and, using these light rays, displays main information of the information processing device to which the upper display module 1 belongs, for example, in colors. In this color display mode, the two-way light sources 6 usually radiate white rays which are advantageous to realization of colors.

In this color display mode, since the upper and lower display modules 1 and 2 of the present invention commonly possess the two-way light sources 6 as single light source means, like the upper display module 1, the lower display module 2 receives white rays. Unless separate measures such as a costly color filter are not provided, the lower display module 2 cannot but display the corresponding information in monochrome.

In consideration of this fact, in the present invention, the transparent color induction film 9 is interposed between the light guide panel 3 and the lower display module 2, preferably between the reflective and transmissive sheet 5 and the lower display module 2. By the presence of the transparent color induction film 9, at the same time that the light rays radiated from the two-way light sources 6 pass through the transparent color induction film 9, they can be colorized to a color pattern of the color induction film 9. As a result, even though the lower display module 2 receives the white rays, it can display the corresponding information in colors.

Similarly to the scattering film 4, the transparent color induction film 9 can be lightly placed on the lower surface of the light guide panel 3 by an insert molding process, or can be directly printed on the lower display module 2 by a printing process. It is to be appreciated that the transparent color induction film 9 may be positioned on the lower surface of the light guide panel 3 in a variety of ways depending upon a situation.

Figure 6:
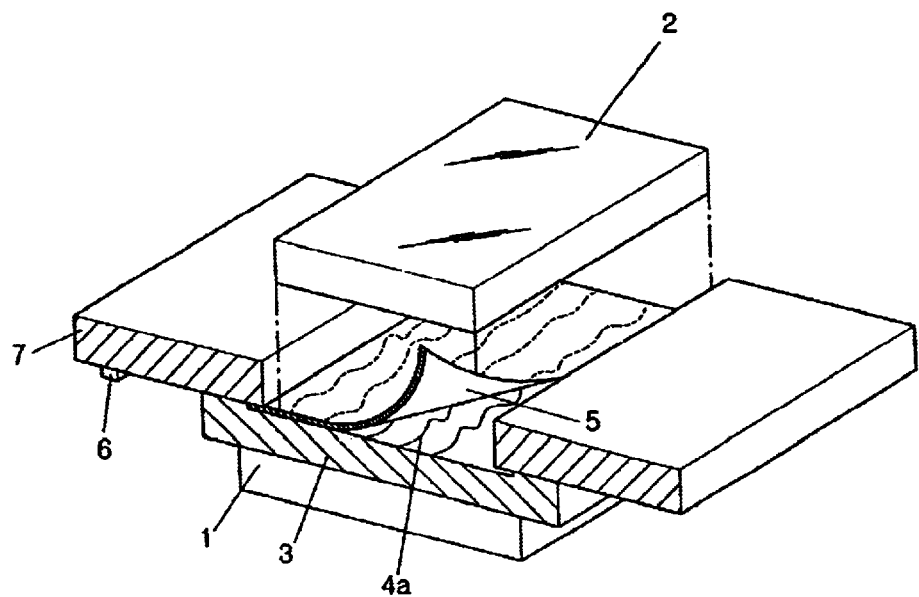
FIG. 6 is a partially-exploded upside-down view illustrating a two-way display-type liquid crystal display device in accordance with a fourth embodiment of the present invention.

In a fourth embodiment of the present invention as shown in FIG. 6, the scattering lines 4a are directly formed on the lower surface of the light guide panel 3 and thereby obviates the need for the scattering film 4.

Of course, in this case, since the scattering lines 4a have a fine line width in the range of 0.5~5.5 μm, differently from the conventional reflective dots, to form an elongate mount structure, it is possible to uniformly and distantly scatter and reflect an increased amount of the light rays radiated from the two-way light sources 6 toward the upper display module 1 when compared to the case of using the conventional reflective dots. Also, when compared to the conventional art using the reflective dots, light rays having a significantly improved brightness are supplied to the upper display module 1.

Resultingly, in this fourth embodiment of the present invention, using the scattering lines 4a, it is possible to improve a brightness and brightness distribution uniformity of the light rays radiated from the two-way light sources 6 and supplied toward the upper display module 1. Thus, a brightness requirement and a brightness distribution uniformity requirement under the color display mode can be properly met.

As apparent from the above description, the two-way display-type liquid crystal display device according to the present invention provides advantages in that, since it has a part layout which enables light rays radiated from one light source to simultaneously contribute to operation of upper and lower display modules, the number of light sources is restrained from being unnecessarily increased, a weight and a thickness of the liquid crystal display device are prevented from being increased, and assembly thereof is prevented from being complicated due to provision of an additional light source.

Also, in the present invention, because it comprises a separate structure such as, scattering film and scattering lines which have an improved light scattering function when compared to the conventional reflective dots, a brightness of light rays radiated from a light source is increased, a requirement under a color display mode can be met, and brightness distribution uniformity is improved.

The two-way display-type liquid crystal display device according to the present invention can be effectively applied to various electronic devices or instruments such as a notebook computer, a desktop computer, a mobile communication terminal, an electronic calculator, a digital camera, and so forth.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A two-way display-type liquid crystal display device comprising:

a pair of upper and lower display modules for displaying different information;

a plurality of two-way light sources for simultaneously supplying predetermined amounts of light rays to the upper and lower display modules;

a light guide panel separately located at a side of the two-way light sources in a manner such that the upper and lower display modules are positioned on upper and lower surfaces of the light guide panel, respectively, the light guide panel functioning to guide light rays radiated from the two-way light sources in two directions toward the upper and lower display modules;

a scattering film interposed between the light guide panel and the lower display module, for scattering and reflecting the light rays radiated from the two-way light sources toward the upper display module; and a reflective and transmissive sheet interposed between the light guide panel and the lower display module, for reflecting one part of the light rays radiated from the two-way light sources toward the upper display module and transmitting the other part of the light rays toward the lower display module.

2. The liquid crystal display device according to claim 1, wherein a plurality of transparent diffusion sheets are interposed between the light guide panel and the upper display module to diffuse the light rays radiated from the two-way light sources toward the upper display module, each transparent diffusion sheet having grain which is formed to extend in a predetermined direction.

3. The liquid crystal display device according to claim 1, wherein a transparent color induction film is interposed between the light guide panel and the lower display module to colorize the light rays radiated from the two-way light sources.

4. The liquid crystal display device according to claim 1, wherein an accommodating groove for accommodating the scattering film and the reflective and transmissive film is formed on the lower surface of the light guide panel.

5. The liquid crystal display device according to claim 1, wherein the scattering film is integrally attached to the lower surface of the light guide panel.

6. The liquid crystal display device according to claim 1, wherein a plurality of scattering lines are formed on a surface of the scattering film to linearly scatter the light rays radiated from the two-way light sources.

7. The liquid crystal display device according to claim 6, wherein the scattering lines have a line width in the range of 0.5~5.5 μm.

8. A two-way display-type liquid crystal display device comprising:

a pair of upper and lower display modules for displaying different information;

a plurality of two-way light sources for simultaneously supplying predetermined amounts of light rays to the upper and lower display modules;

a light guide panel separately located at a side of the two-way light sources in a manner such that the upper and lower display modules are positioned on upper and lower surfaces of the light guide panel, respectively, the light guide panel functioning to guide light rays radiated from the two-way light sources in two directions toward the upper and lower display modules, one surface of the light guide panel being directly formed with a plurality of scattering lines for linearly scattering and reflecting the light rays radiated from the two-way light sources toward the upper display module; and a reflective and transmissive sheet interposed between the light guide panel and the lower display module, for reflecting one part of the light rays radiated from the two-way light sources toward the upper display module, and transmitting the other part of the light rays toward the lower display module.

\* \* \* \* \*